United States Patent
Ferchland et al.

(10) Patent No.: US 7,561,541 B2
(45) Date of Patent: Jul. 14, 2009

(54) DEEP SLEEP MODE FOR WLAN COMMUNICATION SYSTEMS

(75) Inventors: Tilo Ferchland, Dresden (DE); Ralf Flemming, Dresden (DE); Christian Wiencke, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 586 days.

(21) Appl. No.: 10/925,112

(22) Filed: Aug. 24, 2004

(65) Prior Publication Data
US 2005/0190709 A1    Sep. 1, 2005

(30) Foreign Application Priority Data
Feb. 27, 2004   (DE)   ........................ 10 2004 009 695

(51) Int. Cl.
*G08C 17/00* (2006.01)
(52) U.S. Cl. ...................... 370/311; 370/338; 455/574; 455/343.2
(58) Field of Classification Search ......... 455/572–574, 455/522, 69, 343.1–5, 41.2; 370/311, 338; 340/7.32, 7.38
See application file for complete search history.

(56) References Cited

U.S. PATENT DOCUMENTS

| | | | | |
|---|---|---|---|---|
| 5,440,560 A | * | 8/1995 | Rypinski | 370/457 |
| 5,737,323 A | * | 4/1998 | Lansdowne | 370/311 |
| 5,774,791 A | * | 6/1998 | Strohallen et al. | 455/41.1 |
| 5,790,941 A | * | 8/1998 | Peponides | 455/87 |
| 5,806,007 A | * | 9/1998 | Raith et al. | 455/574 |
| 5,826,173 A | * | 10/1998 | Dent | 340/7.38 |
| 5,910,944 A | * | 6/1999 | Callicotte et al. | 370/311 |
| 5,987,339 A | * | 11/1999 | Asano | 455/574 |
| 6,157,816 A | * | 12/2000 | Anderson et al. | 340/7.32 |
| 6,223,047 B1 | * | 4/2001 | Ericsson | 455/517 |
| 6,363,267 B1 | * | 3/2002 | Lindskog et al. | 455/574 |

(Continued)

FOREIGN PATENT DOCUMENTS

EP    1391022    2/2004

(Continued)

OTHER PUBLICATIONS

Translation of Office Action in German application No. 10 200 009 695.3-31 mailed Nov. 17, 2004.

(Continued)

*Primary Examiner*—Sharad Rampuria
(74) *Attorney, Agent, or Firm*—Meyertons Hood Kivlin Kowert & Goetzel, P.C.; Erik A. Heter

(57) ABSTRACT

A WLAN (Wireless Local Area Network) communication device for performing communication in a WLAN network is provided that comprises a physical connection unit, a physical connection oscillator, and a control unit. The physical connection unit is for providing a physical connection of the WLAN communication device to a wireless communication medium. The physical connection oscillator is for providing a physical connection clock signal to the physical connection unit. The control unit is for controlling operation of the physical connection oscillator. The WLAN communication device is operable in a communication mode and in a deep sleep mode. The control unit is adapted to deactivate the physical connection oscillator when the deep sleep mode is entered. Embodiments may provide an extended reduction of the power consumption of the WLAN communication device.

90 Claims, 5 Drawing Sheets

U.S. PATENT DOCUMENTS

| | | | |
|---|---|---|---|
| 6,463,307 B1 | 10/2002 | Larsson et al. | |
| 6,574,200 B1 * | 6/2003 | Tsumura | 370/311 |
| 6,691,071 B2 * | 2/2004 | Kerr et al. | 702/188 |
| 6,760,671 B1 | 7/2004 | Batcher et al. | |
| 6,834,192 B1 * | 12/2004 | Watanabe et al. | 455/444 |
| 6,901,275 B1 * | 5/2005 | Aoyagi | 455/574 |
| 6,950,645 B1 * | 9/2005 | Kammer et al. | 455/343.1 |
| 7,027,843 B2 * | 4/2006 | Cromer et al. | 455/574 |
| 7,072,697 B2 * | 7/2006 | Lappetelainen et al. | 455/574 |
| 7,212,786 B2 * | 5/2007 | Kojima et al. | 455/41.2 |
| RE40,032 E * | 1/2008 | van Bokhorst et al. | 455/343.2 |
| 7,433,670 B2 * | 10/2008 | Benveniste | 455/343.2 |
| 2003/0212531 A1 | 11/2003 | Kerr et al. | |
| 2004/0038707 A1 * | 2/2004 | Kim | 455/554.1 |
| 2004/0253996 A1 * | 12/2004 | Chen et al. | 455/574 |

FOREIGN PATENT DOCUMENTS

| | | | |
|---|---|---|---|
| GB | 2381176 A | * | 4/2003 |
| WO | WO01/69859 | | 9/2001 |

OTHER PUBLICATIONS

PCT Application No. PCT/US05/006113, International Search Report Dated Jun. 9, 2005.

Office Action dated Nov. 28, 2008 for Chinese Patent Application No. 200580013033.9 (English translation provided).

* cited by examiner

DEEP SLEEP MODE FOR WLAN COMMUNICATION SYSTEMS

BACKGROUND OF THE INVENTION

1. Field of the Invention

The present application relates to WLAN (Wireless Local Area Network) communication devices for performing communication in a WLAN network and corresponding integrated circuit chips, computer systems and methods, and in particular to standby modes thereof.

2. Description of the Related Art

A wireless local area network is a flexible data communication system implemented as an extension to or as an alternative for a wired LAN. Using radio frequency or infrared technology, WLAN systems transmit and receive data over the air, minimizing the need for wired connections. Thus, WLAN systems combine data connectivity with user mobility.

Today, most WLAN systems use spread spectrum technology, a wideband radio frequency technique developed for use in reliable and secure communication systems. The spread spectrum technology is designed to trade off bandwidth efficiency for reliability, integrity and security. Two types of spread spectrum radio systems are frequently used: frequency hopping and direct sequence systems.

The standard defining and governing wireless local area networks that operate in the 2.4 GHz spectrum is the IEEE 802.11 standard. To allow higher data rate transmissions, the standard was extended to 802.11 b which allows data rates of 5.5 and 11 Mbps in the 2.4 GHz spectrum. Further extensions exist.

Generally, WLAN systems comprise one or more access points that connect to a wired network and remote client devices that connect to the access points through wireless links. In a peer-to-peer WLAN system, the client devices may also communicate directly with each other. The remote client devices are usually portable computer systems with WLAN communication devices, often referred to as WLAN cards or modules, installed. Since remote devices are usually mobile and often use battery power, the power consumption of the system required for WLAN-related activities is an important feature affecting the battery lifetime and therefore the user friendliness of the system.

In order to reduce the WLAN-related power consumption, many conventional WLAN cards can be operated in a standby mode when no exchange of data packets between the host computer system and an access point is required. Two types of standby modes are usually applied: in a listening mode, the WLAN card listens periodically for traffic from the access point including beacon signals announcing the presence and readiness of the access point. However, no data packets are exchanged with the host computer system. In a sleep mode the link to the access point is disabled. A majority of the WLAN card circuitry is turned off except for certain critical parts.

According to prior art techniques, the parts of the WLAN card circuitry that are kept active during the sleep mode include the very stable reference oscillator that governs the operation of the WLAN card circuitry by providing a base clock signal and stabilizes the operation of the radio circuitry. This usually leads to a still considerable power consumption in the sleep mode: conventional WLAN cards often consume 15-20 mA of current while in the sleep mode, whereof 8-9 mA are consumed solely by the reference oscillator.

In order to extend the battery lifetime of the host computer system, known WLAN cards often extend the time of remaining in the sleep mode. While the WLAN card is in the sleep mode, incoming data packets are buffered at the access point. They may only be retrieved when the WLAN card enters the listening mode in order to find out whether there are data packets queued at the access point and transitions from the standby mode to a communication mode if this is the case. In consequence, conventional WLAN systems often defer the data exchange between the access point and the client device. This may lead to further problems in achieving efficient data rates.

Further, the access points buffering the data packets while the client device is in the sleep mode are generally permitted to dump unread data packets after a specified time and these data packets go unretrieved. Therefore, conventional WLAN systems also have the disadvantage of usually suffering from considerable data loss.

SUMMARY OF THE INVENTION

An improved WLAN communication device for performing communication in a WLAN network and corresponding integrated circuit chips, computer systems and methods are provided that may overcome the disadvantages of the conventional approaches. Embodiments may provide a deep sleep mode for operating a WLAN communication device that may have the advantage of consuming significantly less power in the deep sleep mode than in a conventional sleep mode. In other embodiments, the tradeoff between extending battery lifetime of the host computer system and achieving efficient data rates may be enhanced. In further embodiments, increased battery lifetime may be achieved while not deferring the exchange of data packets between the access point and the client device. In still further embodiments, battery lifetime may be increased while data loss due to deferred reception may be prevented.

In one embodiment, a WLAN communication device for performing communication in a WLAN network is provided comprising a physical connection unit, a physical connection oscillator, and a control unit. The physical connection unit is for providing a physical connection of the WLAN communication device to a wireless communication medium. The physical connection oscillator is connected to the physical connection unit for providing a physical connection clock signal to the physical connection unit. The control unit is connected to the physical connection oscillator for controlling operation of the physical connection oscillator. The WLAN communication device is operable in a communication mode for transmitting and/or receiving data packets and in a first standby mode. The control unit is adapted to deactivate the physical connection oscillator when the WLAN communication device enters the first standby mode.

In another embodiment, an integrated circuit chip for performing communication in a WLAN network is provided comprising a physical connection circuit, a physical connection oscillator circuit, and a control circuit. The physical connection circuit is for providing a physical connection of the integrated circuit chip to a wireless communication medium. The physical connection oscillator circuit is connected to the physical connection circuit for providing a physical connection clock signal to the physical connection circuit. The control circuit is connected to the physical connection oscillator circuit for controlling operation of the physical connection oscillator circuit. The integrated circuit chip is operable in a communication mode for transmitting and/or receiving data packets and in a first standby mode. The control circuit is adapted to deactivate the physical connection oscillator circuit when the integrated circuit chip enters the first standby mode.

In a further embodiment, a computer system for performing communication in a WLAN network is provided comprising a physical connection device, a physical connection oscillator, and a control device. The physical connection device is for providing a physical connection of the computer system to a wireless communication medium. The physical connection oscillator is connected to the physical connection device for providing a physical connection clock signal to the physical connection device. The control device is connected to the physical connection oscillator for controlling operation of the physical connection oscillator. The computer system is operable in a communication mode for transmitting and/or receiving data packets and in a first standby mode. The control device is adapted to deactivate the physical connection oscillator when the computer system enters the first standby mode.

In yet another embodiment, a method of operating a WLAN communication device for performing communication in a WLAN network is provided. A physical connection unit is operated for providing a physical connection of the WLAN communication device to a wireless communication medium. A physical connection oscillator is operated for providing a physical connection clock signal to the physical connection unit. A control unit is operated for controlling operation of the physical connection oscillator. The WLAN communication device is operated in a communication mode for transmitting and/or receiving data packets and in a first standby mode. The physical connection oscillator is deactivated when the operation of the WLAN communication device enters the first standby mode.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings, wherein like elements and structures are indicated by like reference numbers.

Figure 1:
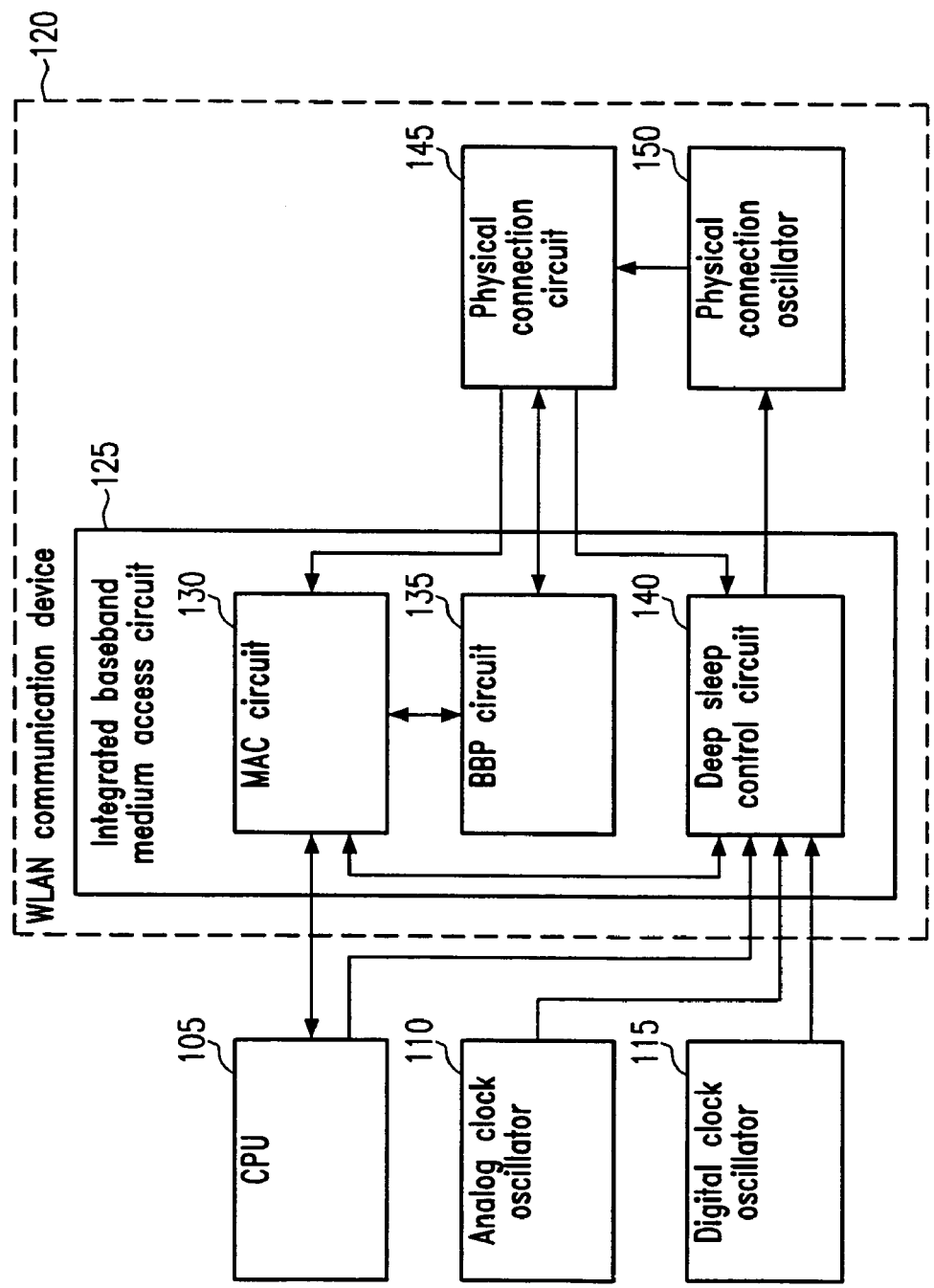
FIG. 1 is a block diagram illustrating the components of a WLAN-compatible computer system according to an embodiment.

Referring now to FIG. 1, a WLAN-compatible computer system according to an embodiment is shown. The computer system may comprise a WLAN communication device 120.

According to the embodiment, the WLAN communication device 120 may comprise a physical connection circuit 145 for providing a physical connection of the WLAN communication device 120 to a wireless communication medium over which communication signals can be exchanged with a WLAN communication counterpart. For instance, the physical connection circuit 145 may comprise a radio circuit or infrared circuit for sending and/or receiving radio or infrared signals respectively over the wireless communication medium. Other transmission/reception techniques may be applied. The physical connection circuit 145 may comprise an internal oscillator for generating the communication signals.

The WLAN communication device 120 may comprise a physical connection oscillator 150 that is connected to the physical connection circuit 145 for providing a physical connection clock signal to the physical connection circuit 145. The physical connection clock signal may be used for stabilizing the frequency generated by the internal oscillator within the physical connection circuit 145. In an embodiment, the physical connection oscillator 150 may be a quartz oscillator generating the physical connection clock signal at a frequency of 44 MHz. Other types of oscillators operating at other frequencies may be applied.

According to an embodiment, the WLAN communication device 120 may comprise a MAC (Medium Access Control) circuit 130 for managing communication in the WLAN network by coordinating access to the wireless communication medium. The WLAN communication device 120 may further comprise a BBP (Base Band Processor) circuit 135 for converting the communication signals interchangeable over the wireless communication medium into digital data packets processable by the MAC circuit 130 and/or vice versa. The BBP circuit 135 may be connected to the physical connection circuit 145 for exchanging the communication signals and to the MAC circuit 130 for exchanging the digital data packets.

Further, the WLAN communication device 120 may comprise a deep sleep control circuit 140 connected to the physical connection oscillator 150 for controlling operation of the physical connection oscillator 150. According to the embodiment, the deep sleep control circuit 140 may further be connected to the MAC circuit 130 for exchanging control signals during the processes of entering and/or abandoning a deep sleep mode of the WLAN communication device 120 which will be described below.

In an embodiment, the physical connection circuit 145 may comprise a frequency divider for generating a main clock signal by dividing the frequency of the physical connection clock signal received from the physical connection oscillator 150. For example, the frequency divider of the physical connection circuit 145 may convert a 44 MHz physical connection clock signal into a 22 MHz main clock signal. In an embodiment, the physical connection circuit 145 may be connected to the MAC circuit 130 and/or the BBP circuit 135 and/or the deep sleep control circuit 140 for providing the main clock signal to the MAC circuit 130 and/or the BBP circuit 135 and/or the deep sleep control circuit 140, respectively.

Further, the MAC circuit 130 and the BBP circuit 135 may be comprised within an integrated baseband medium access circuit 125. In another embodiment, the deep sleep control circuit 140 may also be comprised within the integrated baseband medium access circuit 125. In yet another embodiment, the WLAN communication device 120 may not comprise an integrated baseband medium access circuit 125, but the MAC circuit 130, the BBP circuit 135, and the deep sleep control circuit 140 as separate individual circuits.

In another embodiment, the WLAN communication device 120 may comprise additional internal oscillators besides the physical connection oscillator 150 for providing clock signals to certain components of the WLAN communication device 120.

The WLAN device 120 may be installed on a host computer system comprising a CPU (Central Processing Unit) 105 for providing WLAN compatibility to the computer system. The MAC circuit 130 of the present embodiment may be connected to the CPU 105 for exchanging digital data packets and/or control signals for entering and/or abandoning the below-described deep sleep mode of the WLAN communication device 120. According to the embodiment, the CPU 105 may further be connected to the deep sleep control circuit 140 for sending control signals for entering and/or abandoning the below-discussed deep sleep mode to the deep sleep control circuit 140.

As illustrated, the deep sleep control circuit 140 may be connected to an analog clock oscillator 110 and a digital clock oscillator 115 within the host computer system for receiving a clock signal from the analog clock oscillator 110 and/or the digital clock oscillator 115 while the WLAN communication device 120 is in the below-described deep sleep mode. In other embodiments, the deep sleep control circuit 140 may be connected to either an analog clock oscillator 110 or a digital clock oscillator 115 only. In further embodiments, the deep sleep control circuit 140 may be connected to a plurality of analog and/or digital clock oscillators. In still a further embodiment, the analog clock oscillator 110 and/or the digital clock oscillator 115 may be comprised within the WLAN communication device 120 or within the integrated baseband medium access circuit 125.

Different types of oscillators may serve as the analog clock oscillator 110. For instance, the analog clock oscillator 110 may be a XO (crystal oscillator) oscillator. In one embodiment, the XO oscillator may be an uncompensated XO oscillator. In other embodiments, the XO oscillator may be a compensated XO oscillator, e.g., a voltage-controlled crystal oscillator, a temperature compensated crystal oscillator, or an oven-controlled crystal oscillator.

According to the embodiment, the analog clock oscillator 110 may emit a clock signal at a frequency of 32.768 kHz. In other embodiments, the clock signal generated by the analog clock oscillator 110 may have other frequencies. Combinations of the embodiments may be implemented.

In an embodiment, the digital clock oscillator 115 may be a programmable digital clock oscillator emitting a clock signal at a frequency that can be selected from a certain frequency range. For instance, a clock signal frequency may be selected from a frequency range extending from 32 kHz to 22 MHz. In other embodiments, the clock signal frequency may be selected from a frequency range extending from 16 kHz to 1 MHz or from any other frequency range. In a further embodiment, the digital clock oscillator 115 may be a watchdog oscillator for ensuring robust behavior of components of the host computer system in noisy environments with poor or unreliable power supplies. Combinations of the embodiments may be realized.

Figure 2:
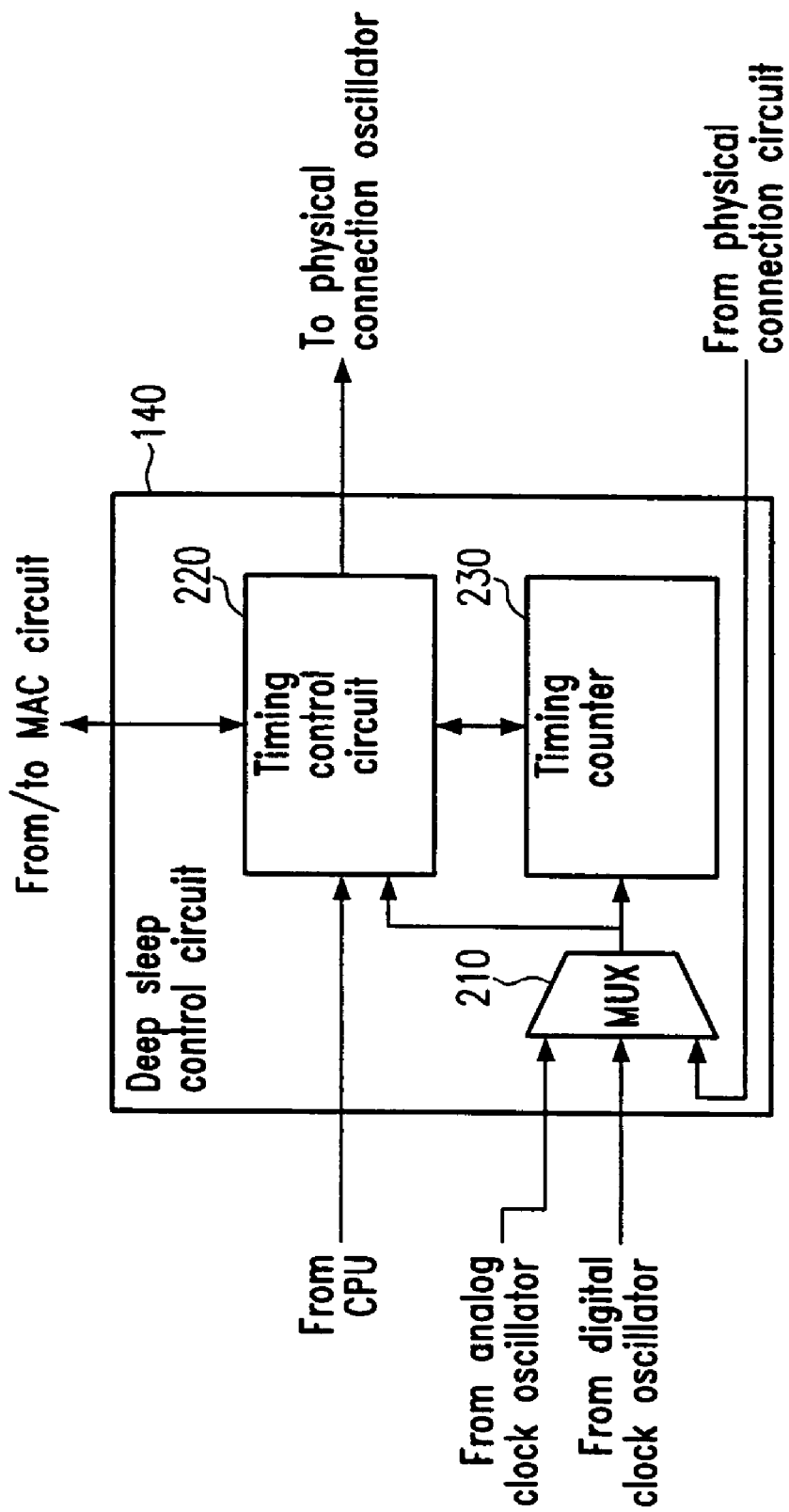
FIG. 2 is a block diagram illustrating the components of the deep sleep control circuit comprised within the WLAN-compatible computer system of FIG. 1 according to an embodiment.

Turning now to FIG. 2, the components of the deep sleep control circuit 140 according to an embodiment are shown. The deep sleep control circuit 140 may comprise a timing counter 230 for counting the number of time intervals of a predetermined length that have elapsed since the WLAN communication device 120 has entered the below-discussed deep sleep mode.

Accordingly, the deep sleep control circuit 140 may further comprise a timing control circuit 220 connected to the timing counter 230 for making the timing counter 230 start and/or stop counting by sending a start counting signal or a stop counting signal, respectively, to the timing counter 230. Further, the timing control circuit 220 may be connected to the CPU 105 and the MAC circuit 130 for receiving or exchanging, respectively, control signals for entering and/or abandoning the below-described deep sleep mode. According to the embodiment, the timing control circuit 220 may also be connected to the physical connection oscillator 150 for controlling operation of the physical connection oscillator 150.

In other embodiments, the timing control circuit 220 and the timing counter 230 may be combined in one single circuit.

The deep sleep control circuit 140 further comprises a multiplexer 210 for forwarding the clock signals received from the physical connection circuit 145 and the analog clock oscillator 110 and/or the digital clock oscillator 115 to the timing control circuit 220 and the timing counter 230. In other embodiments, the multiplexer 210 may be located on the WLAN communication device 120 outside the deep sleep control circuit 140 or outside the integrated baseband medium access circuit 125.

In an embodiment, frequency dividers may be installed between the multiplexer and the physical connection circuit 145 and/or between the multiplexer 210 and the analog clock oscillator 110 and/or between the multiplexer 210 and the digital clock oscillator 115. In one embodiment, a frequency divider may divide the 22 MHz main clock signal from the physical connection circuit 145 by 2,750 in order to generate an 8 kHz clock signal provided to the multiplexer 210. In another embodiment, a frequency divider may divide the 32.768 kHz clock signal from the analog clock oscillator 110 by 4 in order to generate a clock signal of about 8 kHz provided to the multiplexer 210. In yet another embodiment, a frequency divider may generate a clock signal of about 8 kHz by dividing the clock signal of a programmable frequency from the digital clock oscillator 115 accordingly. Clock signals of other frequencies may be provided to and/or generated by the frequency dividers.

Further, the deep sleep control circuit 145 may comprise a frequency divider acting on the frequency of the clock signal provided from the multiplexer 210 to the timing control circuit 220 and the timing counter 230. In one embodiment, this frequency divider may convert a clock signal of (about) 8 kHz into a clock signal of (about) 4 kHz. In other embodiments, this frequency divider may convert a clock signal of a frequency other than 8 kHz into a clock signal of a frequency other than 4 kHz.

In other embodiments, the described frequency dividers connected to the multiplexer 210 may be located outside the deep sleep control circuit 140 or outside the integrated baseband medium access circuit 125.

The timing controller 230 may count the number of time intervals elapsed since the WLAN communication device 120 has entered the below-described deep sleep mode based on the clock signal received over the multiplexer 210. In one embodiment, time intervals of $1/1024$ s may be counted. In other embodiments, the counted time intervals may have other lengths. The timing counter 230 may be programmable in order to select the length of the time intervals to be counted.

The deep sleep control circuit 140 of the present embodiment may be adapted to determine whether a clock signal from the analog clock oscillator 110 and/or the digital clock oscillator 115 is available to the multiplexer 210. The deep sleep control circuit 140 may further be adapted to determine how many clock signals are available to the multiplexer 210 and/or whether the available clock signals are received from analog or digital clock oscillators. Further, the deep sleep control circuit 140 may be adapted to determine the frequency of the available clock signals. Moreover, the deep sleep control circuit 140 may be capable of determining a preferred clock signal if more than one clock signal is available to the multiplexer 210. For instance, the preferred clock signal may be determined by reading preference values for the individual available clock signals from a preference table. Furthermore, the deep sleep control circuit 140 may be arranged for controlling the setting of the multiplexer 210 so that only the preferred clock signal may be passed through the multiplexer 210. In other embodiments, the above-described determination and control steps may be accomplished by individual or combined dedicated circuits within the deep sleep control circuit 140 and/or the integrated baseband medium access circuit 125 and/or the WLAN communication device 120. In further embodiments, at least part of the above-described determination and control steps may be accomplished by the timing control circuit 220 and/or the MAC circuit 130. Combinations of the embodiments may be realized.

According to an embodiment, the WLAN communication device 120 may be operable in a communication mode for exchanging digital data packets with a host computer system and exchanging corresponding communication signals with a WLAN communication counterpart, e.g., an access point or another WLAN communication device, over the wireless communication medium. The communication mode may comprise a reception mode during which the WLAN communication device 120 is detecting the communication signals, demodulating and converting the communication signals into digital data packets and passing the digital data packets to the host computer system. Further, the communication mode may comprise a transmission mode during which the WLAN communication device is modulating and converting the digital data packets into communication signals and sending the communication signals over the wireless communication medium. According to the embodiment, all the components of the WLAN communication device 120 may be active during the communication mode.

The WLAN communication device 120 may further be operable in at least one standby mode. The standby mode may comprise a listening mode during which the WLAN communication device 120 is listening for traffic from a WLAN communication counterpart, but is not passing any data to the host computer system. While the WLAN communication device 120 is in the listening mode, part of its components, e.g., the components only needed for communicating with the host computer system, may be inactive while other components including the physical connection circuit 145 and the physical connection oscillator 150 may be active. The WLAN communication device 120 may consume less power in the listening mode than in the communication mode.

In another embodiment, the standby mode may comprise a sleep mode. While the WLAN communication device 120 is in the sleep mode, no digital data packets may be exchanged with a host computer system. Also, no link to a WLAN communication counterpart may be established during the sleep mode. A majority of the circuitry of the WLAN communication device 120 may be turned off during the sleep mode except for certain critical parts including the physical connection oscillator 150. According to the embodiment, the WLAN communication device 120 may consume less power in the sleep mode than in the listening mode and/or the communication mode. In one embodiment, the WLAN communication device 120 may consume 15-20 mA of current while in the sleep mode, whereof 8-9 mA may be consumed by the physical connection oscillator 150.

In a further embodiment, the standby mode may comprise a deep sleep mode. While in the deep sleep mode, the WLAN communication device 120 may not exchange any digital data packets with the host computer system. No link to WLAN communication counterparts may be established during the deep sleep mode. All the components of WLAN communication device 120 that are inactive during an above-described sleep mode may also be inactive during the deep sleep mode. Additionally, the physical connection oscillator 150 may be inactive during the deep sleep mode. In another embodiment, the MAC circuit 130 and/or the physical connection circuit 145 may also be inactive during the deep sleep mode. The WLAN communication device 120 may consume less power in the deep sleep mode than in the sleep mode and/or the listening mode and/or the communication mode. According to an embodiment, the WLAN communication device 120 may consume 1-2 mA of current during the deep sleep mode.

Embodiments combining the described communication and standby modes may also be implemented.

Figure 3:
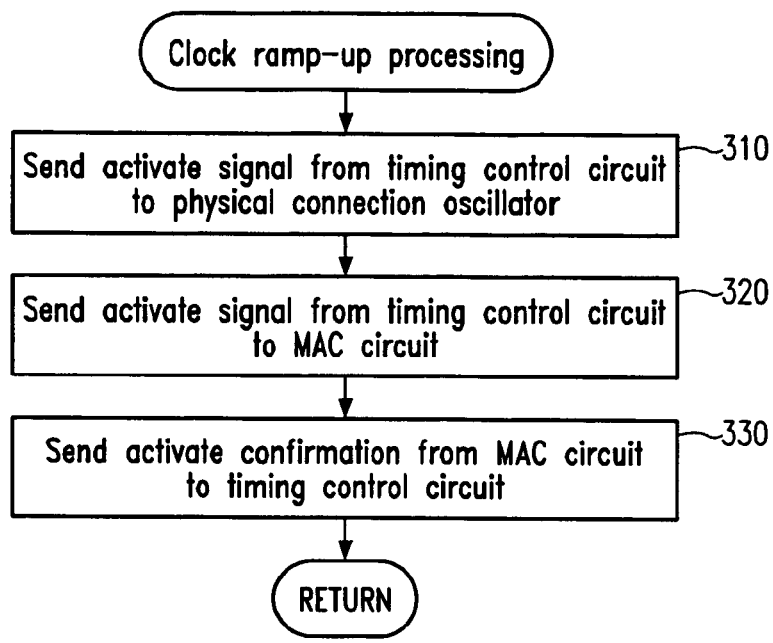
FIG. 3 is a flow diagram illustrating a clock ramp-up process according to an embodiment.

FIG. 3 illustrates a clock ramp-up process that may be performed by the WLAN communication device 120 upon being activated, e.g., after a reset. The clock ramp-up process may also be performed when the WLAN communication device 120 abandons the deep sleep mode. In step 310, an activate signal may be sent from the timing control circuit 220 to the physical connection oscillator 150. Upon reception of the activate signal, the physical connection oscillator 150 may be activated, i.e. the physical connection oscillator 150 may generate the physical connection clock signal. In another embodiment, also the physical connection circuit 145 may be activated once the physical connection oscillator 150 has started to generate the physical connection clock signal. In a further embodiment, additional internal clock oscillators besides the physical connection oscillator 150 (and besides the analog clock oscillator 110 and the digital clock oscillator 115, in case they are comprised within the WLAN communication device 120) may also be activated.

In step 320, an activate signal may be sent from the timing control circuit 220 to the MAC circuit 130 for activating the MAC circuit 130. Once the MAC circuit 130 is active, the MAC circuit 130 may return an activate confirmation signal to the timing control circuit 220 in step 330 for acknowledging the activation.

In an embodiment, the clock ramp-up process may last 1-4 ms.

Figure 4:
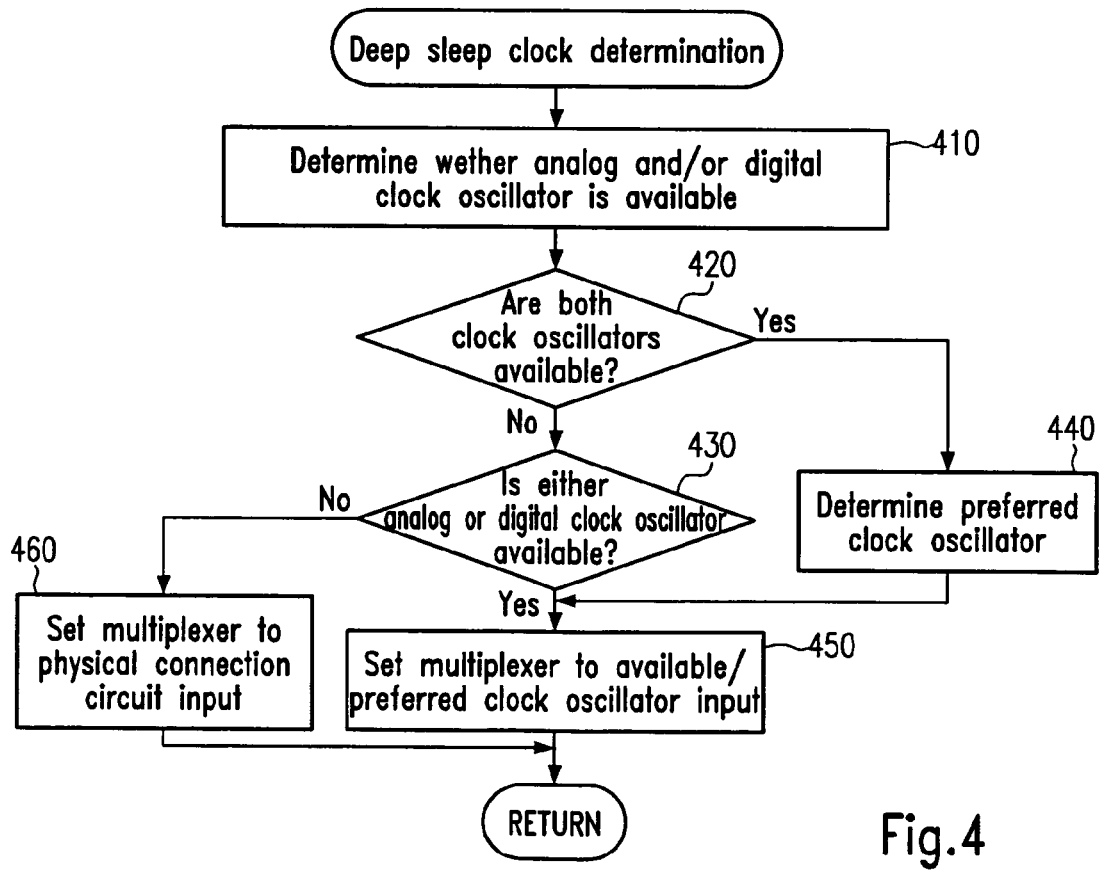
FIG. 4 is a flow diagram illustrating a deep sleep clock determination process according to an embodiment.

Referring now to FIG. 4, a flow diagram illustrating a deep sleep clock determination process according to an embodiment is shown. The deep sleep clock determination process may be performed subsequently to the clock ramp-up process or at any later time prior to entering the deep sleep mode.

In step 410, the system may determine whether a clock signal from the analog clock oscillator 110 and/or the digital clock oscillator 115 is available to the multiplexer 210. This may comprise determining how many clock signals are available and whether the available clock signals are received from the analog clock oscillator 110 and/or the digital clock oscillator 115.

In step 420 it may be queried whether clock signals from both the analog clock oscillator 110 and the digital clock oscillator 115 are available. If this is the case, the system may determine in step 440 which of the available clock signals is preferred and proceed to step 450. Otherwise, it may be queried in step 430 if a clock signal from either the analog clock oscillator 110 or the digital clock oscillator 115 is available. If so, the multiplexer may be set in step 450 to the input from the available or preferred clock oscillator, respectively. Otherwise, the multiplexer may be set in step 460 to the input from the physical connection circuit 145.

Figure 5:
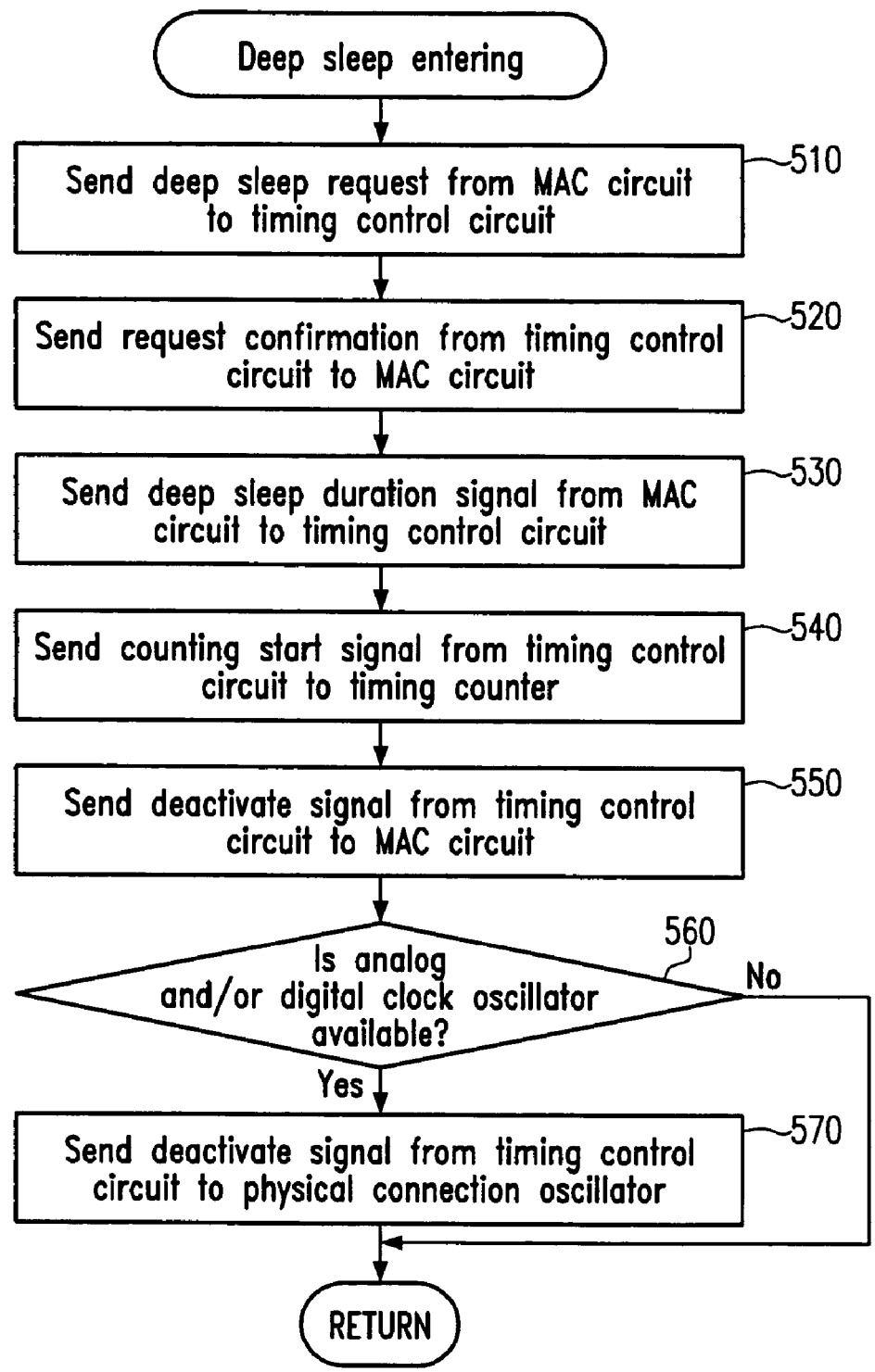
FIG. 5 is a flow diagram illustrating a deep sleep entering process according to an embodiment.

FIG. 5 is a flow diagram illustrating a deep sleep entering process according to an embodiment. In step 510, a deep sleep request signal may be sent from the MAC circuit 130 to the timing control circuit 220. In other embodiments, the deep sleep request signal may be sent to the timing control circuit from the CPU 105 and/or a communication counterpart, e.g., an access point, within the WLAN network. In such embodiments, the deep sleep request signal may be sent to the timing control circuit 220 directly and/or over the MAC circuit 130. In step 520, a request confirmation signal may be sent from the timing control circuit 220 to the MAC circuit 130 if the deep sleep request signal has been received. In other embodiments, the request confirmation signal may be returned to the sender of the deep sleep request signal which may be different from the MAC circuit 130, as indicated above.

According to the illustrated embodiment, the MAC circuit 130 may send a deep sleep duration signal to the timing control circuit 220 in step 530. The deep sleep duration signal may indicate a number of time intervals of a predetermined length corresponding to the intended duration of the deep sleep mode, after which the deep sleep mode may be abandoned automatically. In an embodiment, the deep sleep duration signal may indicate an indeterminate duration of the deep sleep mode. In this embodiment, the deep sleep mode may not be abandoned automatically but, e.g., upon reception of a deep sleep abandon signal from the CPU 105 or upon a reset of the WLAN communication device 120.

According to further embodiments, the deep sleep duration signal may be sent from the CPU 105 and/or an access point within the WLAN network to the timing control circuit 220. In such embodiments, the deep sleep duration signal may be sent to the timing control circuit 220 directly or over the MAC circuit 130. In still a further embodiment, the WLAN communication device 120 may be capable of negotiating a duration of the deep sleep mode with the CPU 105 and/or a communication counterpart, e.g., an access point, within the WLAN network. The order of magnitude of the deep sleep duration may extend from milliseconds to seconds.

In step 540, a counting start signal may be sent from the timing control circuit 220 to the timing counter 230 for making the timing counter 230 start counting the number of time intervals that elapse. Upon reception of the counting signal, the timing counter 230 may continuously count the elapsed time intervals.

According to an embodiment, the WLAN communication device 120 may comprise additional internal oscillators besides the physical connection oscillator 150 (and besides the analog clock oscillator 110 and the digital clock oscillator 115 in case they are comprised within the WLAN communication device 120) for providing clock signals to certain components of the WLAN communication device 120. These additional internal oscillators may be deactivated once the timing counter 230 has started counting.

In step 550, a deactivate signal may be sent from the timing control circuit 220 to the MAC circuit 130. The MAC circuit 130 may be deactivated upon reception of the deactivate signal.

In step 560, it may be queried whether at least one clock signal from the analog clock oscillator 110 and/or the digital clock oscillator 115 is available to the multiplexer 210. If this is the case, a deactivate signal may be sent from the timing control circuit 220 to the physical connection oscillator 150 in step 570. Upon reception of the deactivate signal, the physical connection oscillator 150 may be deactivated. Subsequently, the physical connection circuit 145 may also be deactivated according to an embodiment. If no clock signal is available, neither from the analog clock oscillator 110 nor from the digital clock oscillator 115, the deactivate signal may not be sent to the physical connection oscillator 150 and the deep sleep entering process may be complete at this point.

Figure 6:
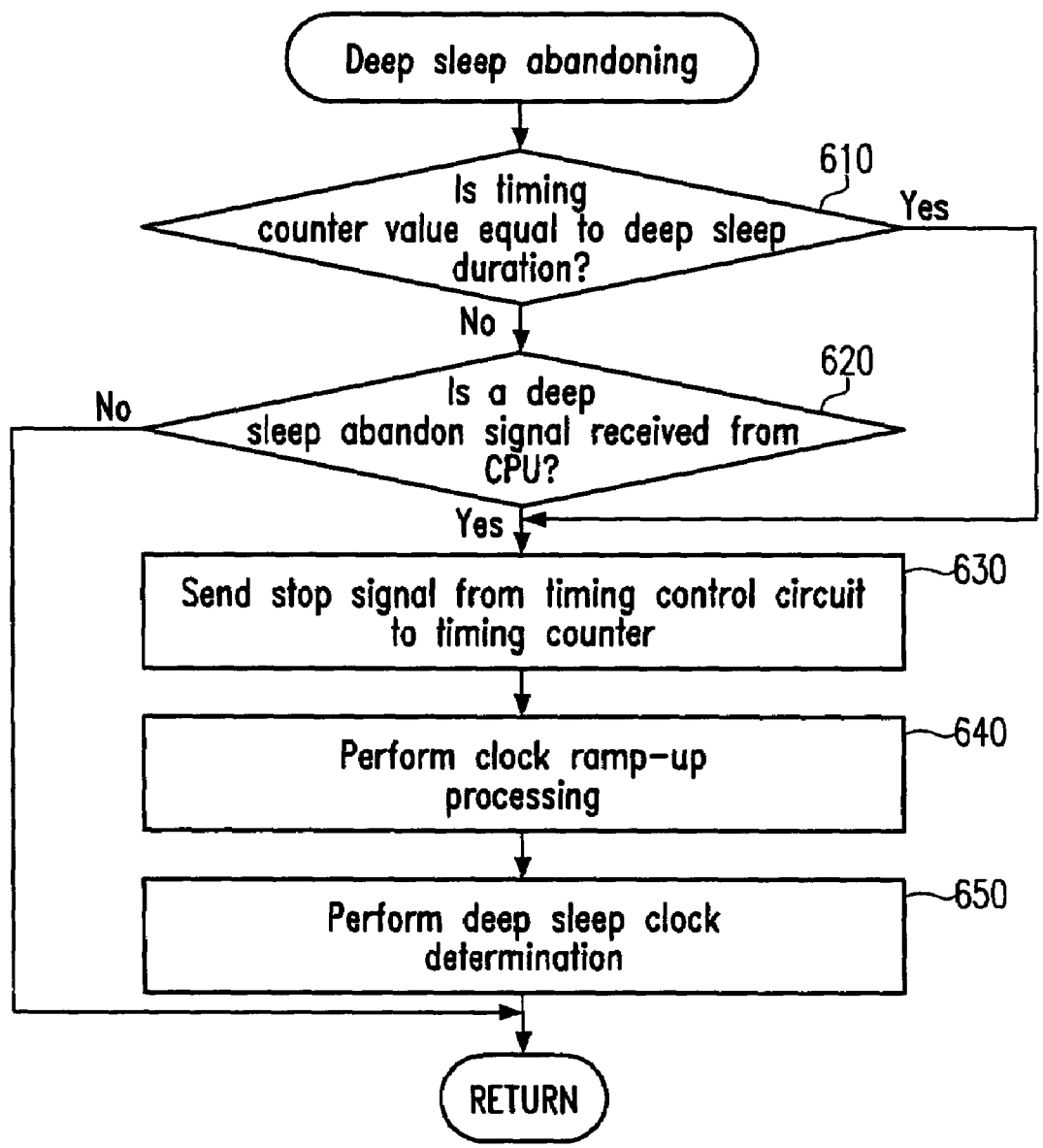
FIG. 6 is a flow diagram illustrating a deep sleep abandoning process according to an embodiment.

Referring now to FIG. 6, a flow diagram illustrating a deep sleep abandoning process according to an embodiment is shown. The deep sleep abandoning process may lead to a transition of the WLAN communication device 120 from the deep sleep mode to the sleep mode, the listening mode or the communication mode.

In step 610, the timing control circuit 220 may determine whether the value of the timing counter 230 indicating the number of time intervals that have elapsed corresponds to the intended duration of the deep sleep mode. If this is the case, the system may proceed to step 630. If this is not the case, it may be determined in step 620 whether a deep sleep abandon signal is received from the CPU 105. In one embodiment, the deep sleep abandon signal may be sent from the CPU 105 to the timing control circuit 220. In another embodiment, the deep sleep abandon signal may be sent from the CPU 105 to the MAC circuit 130 which may forward the deep sleep abandon signal to the timing control circuit 220. If no deep sleep abandon signal is received, the deep sleep mode may not be abandoned. If a deep sleep abandon signal is received, the system may proceed to step 630.

In step 630, a stop signal may be sent from the timing control circuit 220 to the timing counter 230 for making the timing counter stop counting the number of elapsed time intervals. In other embodiments, the timing control circuit 220 may set the counter value to the number of time intervals corresponding to the intended deep sleep duration during the deep sleep entering process. In such embodiments, the timing counter 230 may count backwards and automatically stop counting when the counter value reaches zero.

According to the embodiment, the WLAN communication device 120 may perform the clock ramp-up process in step 640 once the timing counter 230 has stopped counting. Subsequently, or at any later time prior to reentering the deep sleep mode, the deep sleep clock determination may be performed in step 650.

In one embodiment, data packet strings containing a plurality of data packets may be sent to and/or received from a communication counterpart, e.g., an access point or another WLAN communication device, within the WLAN network. Within a data packet string, the individual data packets may be separated by time intervals of a certain length, e.g., 100 ms. According to the embodiment, the WLAN communication device 120 may periodically switch between the communication mode and the deep sleep mode so that it may be in the deep sleep mode during the time intervals separating the data packets.

In other embodiments, the WLAN communication device 120 may be in the deep sleep mode and periodically interrupt the deep sleep mode for transitioning to the listening mode or any other mode for maintaining WLAN network connectivity. For instance, the WLAN communication device 120 may abandon the deep sleep mode for entering the listening mode or the communication mode each time a beacon signal indicating the presence and readiness of a WLAN communication counterpart is sent to the WLAN communication device 120. The beacon signal may include a DTIM (Delivery Traffic Indication Message) message informing the WLAN communication device 120 whether a data packet is awaiting delivery. In case a data packet is queued at the WLAN communication counterpart, the WLAN communication device 120 may enter or remain in the communication mode, respectively, for receiving the waiting data packet. Otherwise, the WLAN communication device 120 may reenter the deep sleep mode upon reception of the beacon signal. In further embodiments, not every beacon signal may include a DTIM message and the WLAN communication device 120 may abandon the deep sleep mode for receiving only those beacon signals that contain a DTIM message. In still other embodiments, the WLAN communication device 120 may negotiate the duration of the deep sleep mode with the WLAN communication counterpart before entering the deep sleep mode.

According to an embodiment, the WLAN communication device 120 may automatically enter the sleep mode upon being activated, e.g., after a reset of the WLAN communication device 120.

As apparent from the above description, embodiments may improve the efficiency of a WLAN-compatible computer system by reducing the system power consumption. System efficiency may be measured, e.g., in terms of the amount of data transmitted/received in proportion to the power consumed. The described embodiments may provide an extended power reduction for a WLAN system with main crystal oscillator switch-off.

As discussed above, the WLAN system may be switched off between two receive data frames. This may contain a switch-off of the chips and the main crystal oscillator. A separate clock source may be used for the wakeup timer and the system may have a controller which computes the next wakeup event.

The presented deep sleep mode for a WLAN system may be applied in combination with AMD's Am1770 and/or Am1773 WLAN products.

While the invention has been described with respect to the physical embodiments constructed in accordance therewith, it will be apparent to those skilled in the art that various modifications, variations and improvements of the present invention may be made in light of the above teachings and within the purview of the appended claims without departing from the spirit and intended scope of the invention. In addition, those areas in which it is believed that those of ordinary skill in the art are familiar have not been described herein in order to not unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) communication device for performing communication in a WLAN network, the WLAN communication device comprising:

a physical connection unit configured to provide a physical connection of the WLAN communication device to a wireless communication medium;

a physical connection oscillator connected to the physical connection unit configured to provide a physical connection clock signal to the physical connection unit; and a control unit connected to the physical connection unit and the physical connection oscillator, the control uniting being configured to control operation of the physical connection oscillator;

wherein the WLAN communication device is operable in a communication mode for transmitting and/or receiving data packets and in a first standby mode;

wherein the control unit is adapted to deactivate the physical connection oscillator when the WLAN communication device enters the first standby mode;

wherein the WLAN communication device is configured to negotiate a duration of the first standby mode with a WLAN communication counterpart within the WLAN network and to abandon the first standby mode after the negotiated duration; and wherein the physical connection unit comprises a frequency divider configured to generate a main clock signal by dividing the frequency of the physical connection clock signal, and wherein the physical connection unit is configured to provide said main clock signal to the control unit.

2. The WLAN communication device of claim 1, further comprising a MAC (Medium Access Control) unit configured to manage communication in the WLAN network by coordinating access to the wireless communication medium.

3. The WLAN communication device of claim 2, wherein the MAC unit is connected to the control unit and configured to request a transition of the WLAN communication device into the first standby mode by sending a first standby request signal to the control unit.

4. The WLAN communication device of claim 3, wherein the control unit is adapted to receive the first standby request signal from the MAC unit and send a request confirmation signal to the MAC unit if the first standby request signal has been received.

5. The WLAN communication device of claim 2, wherein the control unit is connected to the MAC unit and configured to activate and/or deactivate the MAC unit by sending to the MAC unit an activate signal or deactivate signal, respectively.

6. The WLAN communication device of claim 5, wherein the control unit is adapted to deactivate and/or activate the MAC unit when the WLAN communication device enters or abandons the first standby mode, respectively.

7. The WLAN communication device of claim 6, wherein the MAC unit is adapted to be activated upon receiving the activate signal from the control unit and to send an activation confirmation signal to the control unit if the MAC unit has been successfully activated.

8. The WLAN communication device of claim 2, wherein the MAC unit is connected to the control unit and configured to schedule a duration of the first standby mode by sending a first standby duration signal to the control unit.

9. The WLAN communication device of claim 2, further comprising a BBP (Base Band Processor) unit configured to convert communication signals interchangeable over the wireless communication medium into digital data packets processable by the MAC unit and/or vice versa.

10. The WLAN communication device of claim 9, wherein the physical connection unit and the BBP unit are connected for exchanging the communication signals.

11. The WLAN communication device of claim 9, wherein the BBP unit is connected to the MAC unit for exchanging the digital data packets.

12. The WLAN communication device of claim 9, further comprising an integrated baseband medium access unit and wherein the MAC unit and the BBP unit are comprised within the integrated baseband medium access unit.

13. The WLAN communication device of claim 12, wherein the control unit is comprised within the integrated baseband medium access unit.

14. The WLAN communication device of claim 1, further comprising a MAC (Medium Access Control) unit for managing communication in the WLAN network by coordinating access to the wireless communication medium, and wherein the physical connection unit is connected to the MAC unit for providing the main clock signal to the MAC unit.

15. The WLAN communication device of claim 1, further comprising:
  a MAC (Medium Access Control) unit configured to manage communication in the WLAN network by coordinating access to the wireless communication medium; and
  a BBP (Base Band Processor) unit configured to convert communication signals interchangeable over the wireless communication medium into digital data packets processable by the MAC unit and/or vice versa;
  wherein the physical connection unit is connected to the BBP unit for providing the main clock signal to the BBP unit.

16. The WLAN communication device of claim 1, wherein the control unit is adapted to deactivate and/or activate the physical connection oscillator by sending to the physical connection oscillator a deactivate signal or activate signal when the WLAN communication device enters or abandons the first standby mode, respectively.

17. The WLAN communication device of claim 1, further comprising at least one internal oscillator in addition to the physical connection oscillator, the one additional oscillator being configured to provide a clock signal to at least one component of the WLAN communication device.

18. The WLAN communication device of claim 17, wherein the control unit is connected to the at least one internal oscillator and configured to deactivate and/or activate the at least one internal oscillator by sending a deactivate signal or activate signal to the at least one internal oscillator when the WLAN communication device enters or abandons the first standby mode, respectively.

19. The WLAN communication device of claim 1, adapted to be installed on a host computer system comprising a CPU (Central Processing Unit), the WLAN communication being configured to provide WLAN communication functionality to the best computer system.

20. The WLAN communication device of claim 19, wherein the CPU is connected to the control unit and configured to make the WLAN communication device abandon the first standby mode by sending a first standby abandon signal to the control unit.

21. The WLAN communication device of claim 19, further comprising a MAC (Medium Access Control) unit configured to manage communication in the WLAN network by coordinating access to the wireless communication medium and wherein the MAC unit is connected to the CPU for exchanging digital data packets.

22. The WLAN communication device of claim 1, adapted to receive at least one first standby clock signal from at least one first standby clock oscillator while the WLAN communication device is in the first standby mode.

23. The WLAN communication device of claim 22, wherein the control unit is connected to the at least one first standby clock oscillator for receiving the at least one first standby clock signal.

24. The WLAN communication device of claim 22, further adapted to determine before entering the first standby mode whether the at least one first standby clock signal is available to the WLAN communication device.

25. The WLAN communication device of claim 22, further adapted to determine before entering the first standby mode whether more than one first standby clock signal is available to the WLAN communication device.

26. The WLAN communication device of claim 25, further adapted to determine before entering the first standby mode a preferred first standby clock signal if more than one first standby clock signal is available to the WLAN communication device.

27. The WLAN communication device of claim 22, further adapted to receive the at least one first standby clock signal from an analog first standby clock oscillator.

28. The WLAN communication device of claim 22, further adapted to receive the at least one first standby clock signal from a digital first standby clock oscillator.

29. The WLAN communication device of claim 22, further adapted to be installed on a host computer system for providing WLAN communication functionality to the host computer system and to receive the at least one first standby clock signal from at least one first standby clock oscillator within the host computer system.

30. The WLAN communication device of claim 1, wherein the control unit comprises a counting unit configured to count the number of time intervals of a predetermined length that have been elapsed since the WLAN communication device has entered the first standby mode.

31. The WLAN communication device of claim 30, wherein the control unit further comprises a timing control unit connected to the counting unit and configured to make the counting unit start and/or stop counting by sending a counting start signal or counting stop signal to the counting unit, respectively.

32. The WLAN communication device of claim 31, wherein the control unit further comprises a multiplexer configured to forward a main clock signal from the physical connection unit or a first standby clock signal from at least one first standby clock oscillator to the counting unit and the timing control unit while the WLAN communication device is in the first standby mode.

33. The WLAN communication device of claim 32, wherein the counting unit is adapted to count the number of time intervals based on the main clock signal or the first standby clock signal received from the multiplexer.

34. The WLAN communication device of claim 32, further comprising at least one frequency divider configured to reduce the frequency of the at least one first standby clock signal and/or the frequency of the main clock signal before providing the at least one first standby clock signal and/or the main clock signal to the counting unit and the timing control unit.

35. The WLAN communication device of claim 32, further comprising at least one frequency divider configured to reduce the frequency of the at least one first standby clock signal and/or the frequency of the main clock signal before providing the at least one first standby clock signal and/or the main clock signal to the multiplexer.

36. The WLAN communication device of claim 32, wherein the timing control unit is adapted to select a clock signal among the main clock signal and the at least one first standby clock signal to be passed trough the multiplexer to the timing control unit and the counting unit.

37. The WLAN communication device of claim 31, wherein the timing control unit is adapted to determine whether the number of time intervals counted by the counting unit corresponds to a scheduled duration of the first standby mode.

38. The WLAN communication device of claim 1, wherein the WLAN communication device is adapted to be installed on a host computer system for providing WLAN communication functionality to the host computer system;
  wherein the WLAN communication device is further operable in a second standby mode;

wherein the WLAN communication device is further adapted to disable a data packet exchange link to the host computer system when entering the second standby mode;

wherein the WLAN communication device is further adapted to disable a communication link over the wireless communication medium when entering the second standby mode; and wherein the physical connection oscillator is active while the WLAN communication device is in the second standby mode.

39. The WLAN communication device of claim 38, further adapted to automatically enter the second standby mode once the WLAN communication device has been activated.

40. The WLAN communication device of claim 1, wherein the WLAN communication device is adapted to be installed on a host computer system for providing WLAN communication functionality to the host computer system;

wherein the WLAN communication device is further operable in a third standby mode;

wherein the WLAN communication device is further adapted to disable a data packet exchange link to the host computer system when entering the third standby mode; and wherein the WLAN communication device is farther adapted to receive a request to enter the communication mode over the wireless communication medium while the WLAN communication device is in the third standby mode.

41. The WLAN communication device of claim 1, adapted to abandon the first standby mode periodically for determining whether a request to enter the communication mode has been received.

42. The WLAN communication device of claim 1, adapted to abandon the first standby mode periodically for receiving a beacon signal indicating the presence of a WLAN communication counterpart within the WLAN network.

43. The WLAN communication device of claim 1, adapted to be installed on a host computer system comprising a CPU (Central Processing Unit) for providing WLAN communication functionality to the host computer system, wherein the WLAN communication device is further adapted to negotiate a duration of the first standby mode with the CPU and to abandon the first standby mode after the negotiated duration.

44. The WLAN communication device of claim 1, adapted to be installed on a host computer system comprising a CPU (Central Processing Unit) for providing WLAN communication functionality to the host computer system, wherein the WLAN communication device is further adapted to abandon the first standby mode upon reception of a first standby abandon signal from the CPU.

45. A method of operating a WLAN communication device for performing communication in a WLAN (Wireless Local Area Network) network, comprising:

operating a physical connection unit for providing a physical connection of the WLAN communication device to a wireless communication medium;

operating a physical connection oscillator for providing a physical connection clock signal to the physical connection unit, wherein operating the physical connection unit comprises operating a frequency divider for generating a main clock signal by dividing the frequency of the physical connection clock signal;

operating a control unit connected to the physical connection unit and the physical connection oscillator, wherein said operating the control unit includes controlling operation of the physical connection oscillator;

operating the WLAN communication device in a communication mode for transmitting and/or receiving data packets and a first standby mode;

negotiating a duration of the first standby mode with a WLAN communication counterpart within the WLAN network;

deactivating the physical connection oscillator when the operation of the WLAN communication device enters the first standby mode; and abandoning the first standby mode after the negotiated duration;

wherein operating the physical connection unit further comprises providing the main clock signal to the control unit.

46. The method of claim 45, further comprising requesting a transition of the operation of the WLAN communication device into the first standby mode by sending a first standby request signal to the control unit.

47. The method of claim 46, further comprising acknowledging reception of the first standby request signal by the control unit by returning a request confirmation signal.

48. The method of claim 45, further comprising scheduling a duration of the first standby mode by sending a first standby duration signal to the control unit.

49. The method of claim 45, further comprising operating a MAC (Medium Access Control) unit for managing communication in the WLAN network by coordinating access to the wireless communication medium.

50. The method of claim 49, further comprising activating and/or deactivating the MAC unit by sending to the MAC unit an activate signal or deactivate signal, respectively.

51. The method of claim 50, further comprising deactivating and/or activating the MAC unit when the operation of the WLAN communication device enters or abandons the first standby mode, respectively.

52. The method of claim 50, further comprising acknowledging reception of the activate signal by the MAC unit by returning an activation confirmation signal.

53. The method of claim 49, further comprising operating a BBP (Base Band Processor) unit for converting communication signals interchangeable over the wireless communication medium into digital data packets processable by the MAC unit and/or vice versa.

54. The method of claim 53, further comprising exchanging the digital data packets between the BBP unit and the MAC unit.

55. The method of claim 53, wherein operating the BBP unit further comprises exchanging the communication signals with the physical connection unit.

56. The method of claim 53, further comprising operating an integrated baseband medium access unit including the MAC unit and the BBP unit.

57. The method of claim 56, further comprising operating the integrated baseband medium access unit including the control unit.

58. The method of claim 45, wherein operating the physical connection unit further comprises providing the main clock signal to a MAC (Medium Access Control) unit for managing communication in the WLAN network by coordinating access to the wireless communication medium.

59. The method of claim 45, wherein operating the physical connection unit further comprises providing the main clock signal to a BBP (Base Band Processor) unit for converting communication signals interchangeable over the wireless communication medium into digital data packets processable by a MAC (Medium Access Control) unit for managing communication in the WLAN network by coordinating access to the wireless communication medium and/or vice versa.

60. The method of claim 45, further comprising deactivating and/or activating the physical connection oscillator by sending to the physical connection oscillator a deactivate signal or activate signal when the operation of the WLAN communication device enters or abandons the first standby mode, respectively.

61. The method of claim 45, further comprising operating at least one internal oscillator within the WLAN communication device in addition to the physical connection oscillator for providing a clock signal to at least one component of the WLAN communication device.

62. The method of claim 61, further comprising deactivating and/or activating the at least one internal oscillator by sending a deactivate signal or activate signal to the at least one internal oscillator when the operation of the WLAN communication device enters or abandons the first standby mode, respectively.

63. The method of claim 45, further comprising operating the WLAN communication device installed on a host computer system comprising a CPU (Central Processing Unit) for providing WLAN communication functionality to the host computer system.

64. The method of claim 63, further comprising sending a first standby abandon signal from the CPU to the control unit for abandoning operating the WLAN communication device in the first standby mode.

65. The method of claim 63, further comprising exchanging digital data packets between the CPU and a MAC (Medium Access Control) unit for managing communication in the WLAN network by coordinating access to the wireless communication medium within the WLAN communication device.

66. The method of claim 45, wherein operating the WLAN communication device in the first standby mode comprises receiving at least one first standby clock signal from at least one first standby clock oscillator.

67. The method of claim 66, wherein operating the WLAN communication device in the first standby mode further comprises receiving the at least one first standby clock signal by the control unit.

68. The method of claim 66, further comprising determining before entering the first standby mode whether the at least one first standby clock signal is available to the WLAN communication device.

69. The method of claim 66, further comprising determining before entering the first standby mode whether more than one first standby clock signal is available to the WLAN communication device.

70. The method of claim 69, further comprising determining before entering the first standby mode a preferred first standby clock signal if more than one first standby clock signal is available to the WLAN communication device.

71. The method of claim 66, wherein operating the WLAN communication device in the first standby mode comprises receiving the at least one first standby clock signal from an analog first standby clock oscillator.

72. The method of claim 66, wherein operating the WLAN communication device in the first standby mode comprises receiving the at least one first standby clock signal from a digital first standby clock oscillator.

73. The method of claim 66, further comprising:
operating the WLAN communication device installed on a host computer system for providing WLAN communication functionality to the host computer system; and wherein operating the WLAN communication device in the first standby mode comprises receiving the at least one first standby clock signal from a first standby clock oscillator within the host computer system.

74. The method of claim 45, further comprising counting by a counting unit within the control unit the number of time intervals of a predetermined length that have been elapsed since the operation of the WLAN communication device has entered the first standby mode.

75. The method of claim 74, further comprising initiating and/or terminating counting the number of the elapsed time intervals by sending a counting start signal or counting stop signal, respectively, from a timing control unit within the control unit to the counting unit.

76. The method of claim 75, further comprising providing a main clock signal from the physical connection unit or at least one first standby clock signal from at least one first standby clock oscillator over a multiplexer to the counting unit and the timing control unit.

77. The method of claim 76, wherein counting the number of the elapsed time intervals comprises counting the number of the elapsed time intervals based on the main clock signal or based on the at least one first standby clock signal.

78. The method of claim 76, further comprising reducing the frequency of the main clock signal or the at least one first standby signal, respectively, by means of a frequency divider before providing the main clock signal or the first standby signal, respectively, to the counting unit and the timing control unit.

79. The method of claim 76, further comprising reducing the frequency of the main clock signal or the at least one first standby signal, respectively, by means of a frequency divider before providing the main clock signal or the first standby signal, respectively, to the multiplexer.

80. The method of claim 76, further comprising selecting a clock signal among the main clock signal and the at least one first standby clock signal to be passed through the multiplexer to the timing control unit and the counting unit.

81. The method of claim 74, further comprising determining whether the number of time intervals counted by the counting unit corresponds to a scheduled duration of the first standby mode.

82. The method of claim 45, further comprising:
operating the WLAN communication device installed on a host computer system for providing WLAN communication functionality to the host computer system;
operating the WLAN communication device in a second standby mode;
disabling a data packet exchange link between the WLAN communication device and the host computer system when the operation of the WLAN communication device enters the second standby mode;
disabling a communication link of the WLAN communication device over the wireless communication medium when the operation of the WLAN communication device enters the second standby mode; and
actively operating the physical connection oscillator while the WLAN communication device is operated in the second standby mode.

83. The method of claim 82, further comprising automatically entering the operation of the WLAN communication device in the second standby mode once the WLAIN communication device has been activated.

84. The method of claim 45, further comprising:
operating the WLAN communication device installed on a host computer system for providing WLAN communication functionality to the host computer system;

operating the WLAN communication device in a third standby mode; disabling a data packet exchange link between the WLAN communication device and the host computer system when the operation of the WLAN communication device enters the third standby mode; and receiving by the WLAN communication device a request to enter the communication mode over the wireless communication medium while the WLAN communication device is operated in the third standby mode.

85. The method of claim 45, further comprising abandoning the first standby mode periodically for determining whether a request to enter the communication mode has been received.

86. The method of claim 45, further comprising abandoning the first standby mode periodically for receiving a beacon signal indicating the presence of a WLAN communication counterpart within the WLAN network.

87. The method of claim 45, further comprising:

operating the WLAN communication device installed on a host computer system comprising a CPU (Central Processing Unit) for providing WLAN communication functionality to the host computer system;

negotiating a duration of the first standby mode with the CPU; and abandoning the first standby mode after the negotiated duration.

88. The method of claim 45, further comprising:

operating the WLAN communication device installed on a host computer system comprising a CPU (Central Processing Unit) for providing WLAN communication functionality to the host computer system;

receiving a first standby abandon signal from the CPU; and abandoning the first standby mode upon reception of the first standby abandon signal.

89. An integrated circuit chip for performing communication in a WLAN network, the integrated circuit chip comprising:

a physical connection circuit configured to provide a physical connection of the integrated circuit chip to a wireless communication medium;

a physical connection oscillator circuit connected to the physical connection circuit and configured to provide a physical connection clock signal to the physical connection circuit; and a control circuit connected to the physical connection circuit and the physical connection oscillator circuit, wherein the control circuit is configured to control operation of the physical connection oscillator circuit;

wherein the integrated circuit chip is operable in a communication mode for transmitting and/or receiving data packets;

wherein, in a first standby mode, the control circuit is adapted to deactivate the physical connection oscillator circuit when the integrated circuit chip enters the first standby mode;

wherein the integrated circuit chip is configured to negotiate a duration of the first standby mode with a WLAN communication counterpart within the WLAN network and to abandon the first standby mode after the negotiated duration; and wherein the physical connection unit comprises a frequency divider configured to generate a main clock signal by dividing the frequency of the physical connection clock signal, and wherein the physical connection circuit is configured to provide said main clock signal to the control circuit.

90. A computer system for performing communication in a WLAN network, the computer system comprising:

a physical connection device configured to provide a physical connection of the computer system to a wireless communication medium;

a physical connection oscillator connected to the physical connection device and configured to provide a physical connection clock signal to the physical connection device; and a control device connected to the physical connection device and physical connection oscillator, wherein the control device is configured to control operation of the physical connection oscillator;

wherein the computer system is operable in a communication mode for transmitting and/or receiving data packets;

wherein, in a first standby mode, the control device is adapted to deactivate the physical connection oscillator when the computer system enters the first standby mode;

wherein the computer system is configured to negotiate a duration of the first standby mode with a WLAN communication counterpart within the WLAN network and to abandon the first standby mode after the negotiated duration; and wherein the physical connection unit comprises a frequency divider configured to generate a main clock signal by dividing the frequency of the physical connection clock signal, and wherein the physical connection device is configured to provide said main clock signal to the control device.

* * * * *